Patented Aug. 28, 1928.

1,682,280

UNITED STATES PATENT OFFICE.

ALAN C. JOHNSTON, OF MINE HILL, NEW JERSEY, ASSIGNOR TO HERCULES POWDER COMPANY, OF WILMINGTON, DELAWARE, A CORPORATION OF DELAWARE.

PROCESS OF PREPARING ALKYL ESTERS OF ABIETIC ACID.

No Drawing.  Application filed July 29, 1926.  Serial No. 125,833.

In the preparation of alkyl esters of abietic acid, it is usual to first prepare pure abietic acid and then esterify it; and it is usual to obtain the abietic acid by refining gum rosin by means of solvents, which is a troublesome and costly process. As examples of methods of preparing alkyl esters of abietic acid, it is known that they may be prepared from the silver salt of abietic acid and ethyl iodide, dimethyl sulphate and sodium abietate, the acid chloride and alcohol, or by refluxing an alcoholic rosin solution with sulphuric acid.

The object of my invention is to prepare alkyl esters of abietic acid by a process substantially different from any heretofore known and which presents certain advantages, particularly simplicity and cheapness.

The invention involves, or at least permits, the use of wood rosin, permissibly a brown wood rosin, as distinguished from gum rosin, and in place of abietic acid, whether prepared from gum rosin or derived from any other source, and in esterification in the presence of a caustic alkali (in practice an excess) instead of an acid or a neutral solution. By my process, the initial preparation of the abietic acid is rendered unnecessary, and the use of wood rosin results in a decided cheapening, as well as a simpification, in the production of the ester.

The process may be carried out in many different ways. The use of different alkaline media is permissible, and the quantities, temperatures and other details of procedure are capable of considerable variation. The following example, however, will enable one skilled in the art to practice the process without the necessity of experiment.

Twenty grams of sodium hydroxide are dissolved in 25 cc. of water and then diluted with 150 cc. of ethyl alcohol. One hundred and fifty grams of wood rosin are added, and the mixture refluxed until a clear solution is obtained. Forty grams of diethyl sulphate (115% of that theoretically required) are gradually added and the alcohol distilled off. The residue is then heated to about 145° C. for from one to two hours, accompanied, probably, by agitation in order to shorten the time required for completion of the reaction, and finally the ethyl ester of abietic acid is distilled off under a vacuum. The color body of the wood rosin does not pass over in the vacuum distillation, so that a clear ester is produced. The yields obtained are about 80-85% of the weight of the rosin used. The acid number of the product is about 10, but this will vary with the completeness of esterification and the point at which the distillation is cut.

In place of sodium hydroxide, other caustic alkalies, such as potassium hydroxide or calcium hydroxide, may be used; and other alcohols may be used in place of ethyl alcohol.

Any alkyl sulfate may be used, for example, diethyl sulphate, dimethyl sulfate etc. A wider range of esters can be prepared by the use of alkyl halides instead of alkyl sulfates; but alkyl sulfates are preferred. In the case of some alkyl halides, e. g., ethyl chloride, it would be necessary to carry out the reaction under pressure. Mixed alkyl chlorides, such as may be obtained from petroleum, are a desirable source of these esters. Aryl halides may in some instances be used, yielding aryl esters in the place of alkyl esters.

The temperature of reaction is found to be of importance. When employing diethyl sulfate, it is undesirable to go much outside the range of about 140-150° C., although the permissible range may in some cases be extended to 130-160° C., the duration of heating varying from (say) one to four hours, dependent on the temperature. Temperature control is important, because if the temperature of reaction is held too low, only one alkyl group in the alkyl sulfate reacts, while if it is too high, some decomposition of the alkyl sulfate occurs.

The methyl and ethyl esters of abietic acid are very thick, viscous liquids, and are very difficult to saponify, distilling in a vacuum of 10 mm. at 200-210° C. These esters exert a slow colloiding action on nitrocellulose. They are miscible in all proportions with other organic esters, benzol, acetone and butanol. They are somewhat soluble in 95% ethyl alcohol. These esters readily dissolve ester gum or damar, but manila copal is less soluble.

While certain claims are restricted to wood rosin, it is to be understood that the process is applicable to gum rosin, but the more important advance in the art arises from the fact that the process is one which permits the use of a dark wood rosin, which is a relatively cheap product. The adaptation of the process to gum rosin would present less decided economic advantages.

It should be understood that esterification of rosin in alkaline media is not broadly new, the methyl ester having been prepared from pinabietic acid, melting at 182° C., (similar to abietic acid, melting at 155° C.), alcohol and sodium hydroxide. My method, however, permits the use of dark wood rosin instead of refined abietic acid, and (by proper temperature control) permits cutting down the amount of the alkyl sulfate or alkyl halide by about fifty per cent while yet obtaining the same amount of ester.

It will be understood that where in the claims appended hereto the term alkylating agent is used, I intend the product obtained by replacing a hydrogen atom of an inorganic acid with an alkyl radical, for example, ethyl chloride, diethyl sulfate, dimethyl sulfate and the like.

Having now fully described my invention, what I claim and desire to protect by Letters Patent is:

1. The process of preparing an alkyl ester of abietic acid which comprises the step of treating wood rosin with an alkyl sulfate in the presence of an alkali.

2. The process of preparing an alkyl ester of abietic acid which comprises adding wood rosin to a solution of an alkali in an alcohol, refluxing until a clear solution is obtained, adding an alkylating agent and distilling off the alcohol, heating the residue, and distilling off the alkyl ester of abietic acid.

3. The process of preparing an alkyl ester of abietic acid which comprises adding rosin to a solution of a caustic alkali in an alcohol, refluxing until a clear solution is contained, distilling off the alcohol, adding an alkyl sulfate, heating the residue to and maintaining it at such temperature as will insure substantially complete reaction, and avoid decomposition, of the alkyl sulfate, and under reduced pressure distilling off the alkyl ester of abietic acid.

4. The process of preparing an alkyl ester of abietic acid which comprises adding rosin to a solution of an alkali in an alcohol, distilling off the alcohol, adding an alkyl sulfate in an amount by weight not exceeding one third the weight of the wood rosin and distilling off the alcohol, heating the residue, and distilling off the alkyl ester of abietic acid.

5. The process of preparing the ethyl ester of abietic acid which comprises adding rosin to a solution of a caustic alkali in an alcohol, refluxing until a clear solution is obtained, distilling off the alcohol, adding diethyl sulfate, heating the residue to and maintaining it at such temperature, not less than 130° C. or more than 160° C., as will insure substantially complete reaction, and avoid decomposition, of the diethyl sulfate, and distilling off under reduced pressure the ethyl ester of abietic acid.

6. The process of preparing an alkyl ester of abietic acid which includes the step of treating wood rosin with an alkylating agent in the presence of alkali.

7. The process of preparing an alkyl ester of abietic acid which includes the step of treating wood rosin with an alkylating agent in the presence of alkali and alcohol.

8. The process of preparing an alkyl ester of abietic acid which includes adding rosin to a solution of a caustic alkali in an alcohol, refluxing until a clear solution is obtained, distilling off the alcohol, adding an alkylating agent, heating the residue to and maintaining it at such temperature as will insure substantially complete reaction, and avoid decomposition, of the alkylating agent, and distilling off under reduced pressure the alkyl ester of abietic acid.

9. The process of preparing an alkyl ester of abietic acid which includes the step of treating wood rosin with diethyl sulfate in the presence of an alkali.

10. The process of preparing an alkyl ester of abietic acid which includes the step of treating wood rosin with diethyl sulfate in the presence of an alkali and alcohol.

11. The process of preparing an alkyl ester of abietic acid which includes the step of treating abietic acid with an alkylating agent in the presence of an alkali and alcohol.

In testimony of which invention, I have hereunto set my hand, at Kenvil, New Jersey, on this 26th day of July, 1926.

ALAN C. JOHNSTON.